United States Patent [19]

Mayer

[11] Patent Number: 5,372,081
[45] Date of Patent: Dec. 13, 1994

[54] HAND-HELD SAIL DEVICE

[76] Inventor: Michael B. Mayer, 13135 W. Cross La., Littleton, Colo. 80127

[21] Appl. No.: 242,013

[22] Filed: May 12, 1994

[51] Int. Cl.[5] .............................................. B63H 9/04
[52] U.S. Cl. ................................................... 114/103
[58] Field of Search ...................... 114/39.1, 39.2, 102, 114/103, 89, 97; 280/810

[56] References Cited

U.S. PATENT DOCUMENTS

| | | | |
|---|---|---|---|
| 3,858,542 | 1/1975 | Lenoble | 114/39.1 |
| 3,924,870 | 12/1975 | Spivack et al. | 280/810 |
| 4,505,216 | 3/1985 | Elorza | 114/39.2 |

FOREIGN PATENT DOCUMENTS

| | | | |
|---|---|---|---|
| 2835827 | 2/1979 | Germany | 114/39.2 |
| 2833616 | 2/1980 | Germany | 114/102 |

*Primary Examiner*—Ed Swinehart
*Attorney, Agent, or Firm*—John L. Isaac

[57] ABSTRACT

A hand-held sail device is disclosed and includes a sail sized and shaped to define an airfoil configuration. The sail includes an upper edge, a lower edge and a leech edge. A frame supports the sail and includes a mast having front and rear end portions and is adapted for securing the upper edge of the sail, and a boom which also has front and rear end portions and is adapted for securing the lower edge of the sail. A hand gripping member is disposed on the windward side of the sail and has top and bottom end portions pivotally secured, respectively, to the rear end portions of the mast and the boom. A first connector mechanism joins the front end portions of the mast and the boom. A second connector mechanism pivotally interconnects the gripping member top end portion with the mast rear end portion, while a third connector mechanism pivotally interconnects the bottom end portion of the gripping member with the boom rear end portion. Finally, a mechanism as provided for limiting the pivotal movement of the gripping member away from the sail.

33 Claims, 2 Drawing Sheets

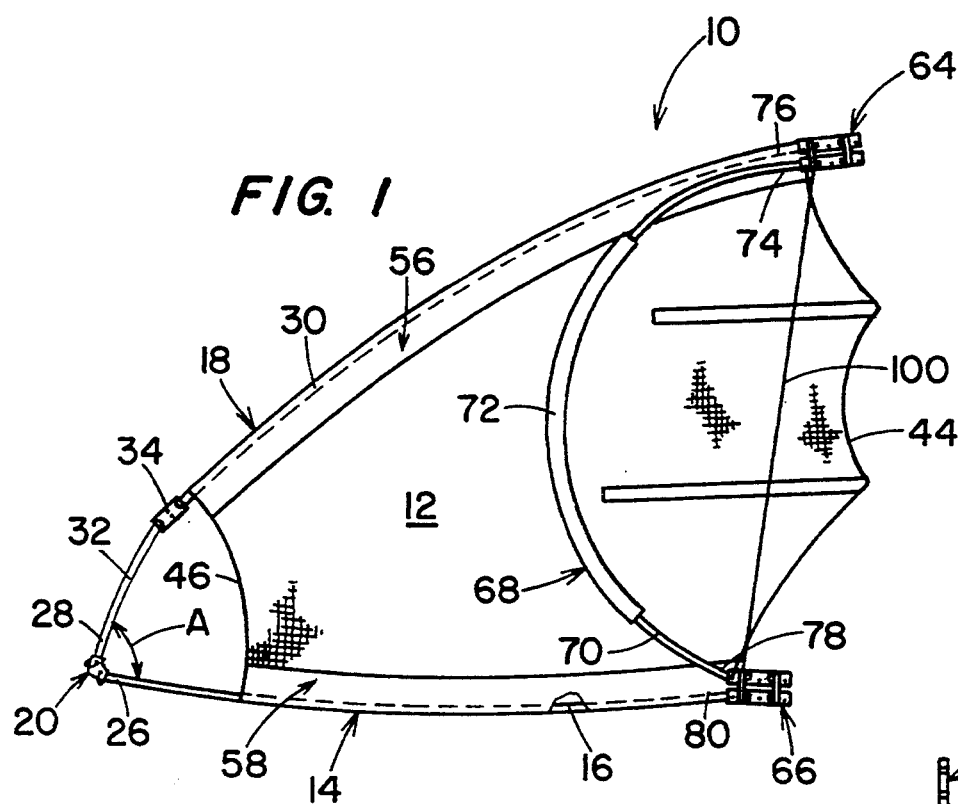
FIG. 1
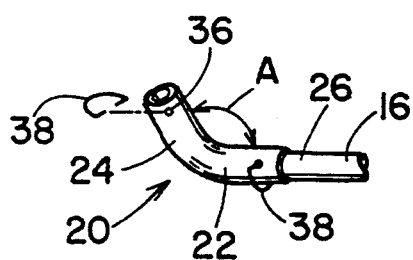
FIG. 3
FIG. 2
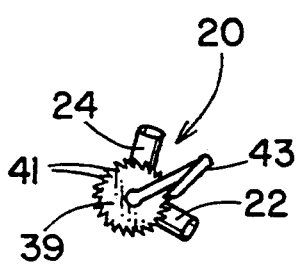
FIG. 3A
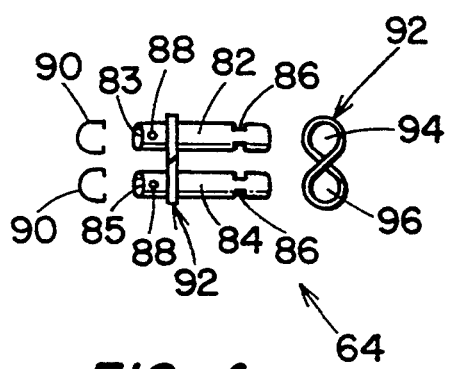
FIG. 4

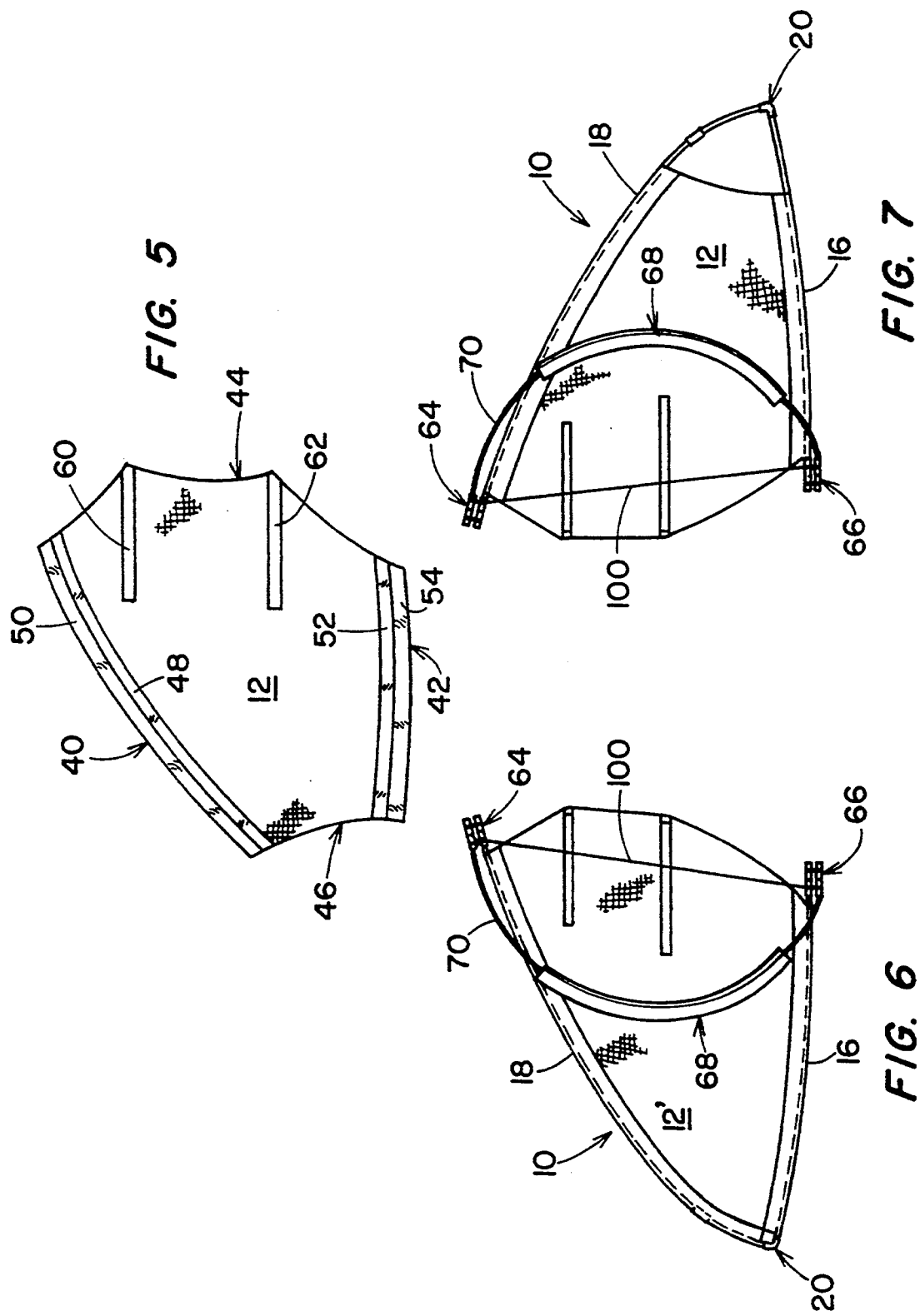

HAND-HELD SAIL DEVICE

BACKGROUND OF THE INVENTION

1. Field of the Invention

This invention relates, generally, to wind propulsion devices and, more particularly, to hand-held sail devices designed for use by individuals having support members on their feet, such as ice skates, roller skates, roller blades and the like. Specifically, the present invention relates to an improved hand-held sail device which is light-weight, readily collapsible, and easy to control during use.

2. Description of the Prior Art

The use of devices propelled by wind is an old technique. Vehicles propelled by sail, as an example of such devices, are almost as old as mankind. Examples that are well known include sail ships, prairie schooners, and the like. With the advent of surfboards, skateboards, roller skates, ice skates and the like, the application of the devices for propulsion has followed. Examples of the application of such a sailing device to skateboards, surfboards and the like, is illustrated in U.S. Pat. No. 3,982,766, while the application of such devices to wind surfing include U.S. Pat. Nos. 4,498,410 and 5,272,996, German Patent No. DE 3406040 A1, and European patent application No. 0 076 954. In each of these instances, the sail device is attached at its bottom to the skateboard or surfboard.

There are a number of instances, however, where a platform is not available for attachment of such a sailing device. These instances include the use of ice skates, roller blades, roller skates and the like. Hand-held sail-type devices have been known for some time for application to such uses. Such devices include those disclosed in U.S. Pat. Nos. 1,859,178, 2,793,870, 3,768,823, 3,924,870, 4,269,133, and 4,651,665. Such a device is also disclosed in German Pat. No. 2900681. Of these illustrated devices, the sail device may be intended for use on the windward side of the skater in order to push the skater along the surface. In certain other instances, the sail is designed to be used on the leeward side of the skater in order to pull the skater along. In many of these instances, the sailing device is rigid without any specific controlling device available, thus relegating control to the strength of the particular individual utilizing the device. Moreover, many of these devises are quite large and cumbersome and thus inherently difficult to control. The U.S. Pat. No. 3,924,870 illustrates a hand-held sail device which does have a separate control mechanism as a portion thereof. However, the control mechanism is designed to require the use of both arms of an individual and has no inherent limiting capability designed therein to ease use of the individual's arms relative to the strength of the wind. In addition, the sail devices illustrated in the above patents are, while in some instance collapsible, not easily capable of being collapsed and/or reassembled for transport.

With the popularity of roller blades, skateboards and the like, there remains a need for a lightweight, hand-held sail device for use to assist in propelling an individual on skates or other similar transportation devices, which sail device is easy to maneuver and manipulate, easy to assemble and collapse, and is designed to reduce arm fatigue of an individual utilizing such a device.

Summary of the Invention

Accordingly, it is one object of the present invention to provide a hand-held sail device for use by an individual on roller blades, ice skates, roller skates or any other type of transportation device secured to or associated with the feet of the user.

It is another object of the present invention to provide a hand-held sail device which is lightweight, collapsible and easy to assemble.

Yet another of the object present invention is to provide such a hand-held sail device which is sufficiently compact in size to provide for easy use yet large enough in order to provide substantial propulsion capability. A further object of the present invention is to provide a hand-held sail device that has a handle inherent therein capable of adjustably controlling response of the sail to the strength of the wind.

To achieve the foregoing and other objects and advantages, and in accordance with the purposes of the present invention as embodied and broadly described herein, a hand-held sail device is disclosed and includes a sail sized and shaped to define an airfoil configuration. The sail includes an upper edge, a lower edge and a leech edge. A frame supports the sail and includes a mast having front and rear end portions and is adapted for carrying the upper edge of the sail, and a boom which also has front and rear end portions and is adapted for carrying the lower edge of the sail. A hand gripping member is disposed on the windward side of the sail and has top and bottom end portions pivotally secured to the rear end portions, respectively, of the mast and the boom. A first connector mechanism joins the front end portions of the mast and the boom. A second connector mechanism pivotally interconnects the gripping member top end portion with the mast rear end portion, while a third connector mechanism pivotally interconnects the bottom end portion of the gripping member with the boom rear end portion. Finally, a mechanism is provided for which limits the pivotal movement of the gripping member away from the sail.

Brief Description of the Drawings

The accompanying drawings which are incorporated in and form a part of the specification, illustrate preferred embodiments of the present invention and, together with a description, serve to explain the principles of the invention. In the drawings:

FIG. 1 is a side view illustrating a sail device constructed in accordance with the present invention as viewed from the windward side of the sail device;

FIG. 2 is a top-plan view, with some parts in shadow, of the sail device illustrated in FIG. 1;

FIG. 3 is an enlarged view of the first connector member with some parts broken away;

FIG. 3A is an enlarged view of an alternate embodiment for the first connector member;

FIG. 4 is an enlarged, exploded perspective view of a second connector member constructed for use with the present invention;

FIG. 5 is a side-plan view of the sail portion of the device constructed in accordance with the present invention illustrating the sail portion in a planer, unassembled state;

FIG. 6 is a reduced size view similar to that of FIG. 1 illustrating a second embodiment of the present invention arranged for right-handed use; and FIG. 7 is a view of the embodiment illustrated in FIG. 6, with certain sail modifications, and illustrating the sail device arranged for left-handed use.

DETAILED DESCRIPTION OF THE PREFERRED EMBODIMENT

Referring in particular to FIGS. 1,2,3 and 5, a handheld sail device 10 is illustrated having a sail member 12 and a frame 14 to which the sail member 12 is attached. In preferred form, the device 10 is in the form of a fore-and-aft sail and the frame 14 includes a boom member 16 and a mast 18. The boom 16 and the mast 18 are secured together using a connecting member 20 which in preferred form is an elbow joint having tubular end portions 22 and 24. The tubular end portions 22, 24 are adapted for receiving the front end portions 26 and 28, respectively, of the boom 16 and the mast 18. While the mast 18 and the boom 16 may each be one unitary member, they may also be formed from multiple interconnected parts. In the illustrated and preferred embodiment, the mast 18 includes an upper mast member 30 for attachment to the sail 12 and a lower mast connection portion 32. The mast members 30, 32 are interconnected by a tubular connector 34. A two-part mast construction as illustrated in FIG. 1 enables easy assembly, disassembly and storage of the device 10 as well as permits a greater arc to be formed by the curvature of the mast 18 without having to further modify angle "A" as discussed below.

In the preferred and illustrated embodiment of the present invention, the connector 20 is, as previously discussed, preferably in the form of an elbow joint having an angle "A" between the tubular end portions 22, 24 of greater than 80 degrees and more preferably greater than 90 degrees. When the sail device 10 is assembled, the end portions 26, 28 of the boom 16 and the mast 18, respectively, are inserted into the tubular end portions 22, 24 of the elbow 20 and then moved toward each other so as to reduce the angle "A" to preferably 75-80 degrees. This angle of 75-80 degrees is maintained in the manner described further below. However, it is the creation of this angle "A" of 75-80 degrees which creates a divergent bias force between the boom 16 and the mast 18 urging them apart. This bias force in turn creates a tension in the sail 12 when the device 10 is fully assembled, and this tension or tautness in the sail 12 significantly enhances the performance of the device 10.

Referring with particularity to FIG. 3, the connector member 20 is illustrated in more detail. As previously indicated, the tubular end portions 22, 24 are sized and shaped for slip-fit attachment with the front end portions 26, 28 of the mast 18 and the boom 16. The end portions 22, 24 each contain a pair of apertures 36 which are aligned with similar apertures (not illustrated) in the end portions 26, 28 of the boom 16 and the mast 18 when the end portions 26, 28 are inserted within the end portions 22, 24 of the elbow connector member 20. Once this has been accomplished, removable U-shaped pin members 38 are utilized to engage the apertures 36 and the aligned apertures of the end portions 26, 28 so as to securely affix the end portions 26, 28 within the connector member 20. This arrangement is also devised so as to permit the boom 16 and the mast 18 to be readily removable from the connector 20 for easy disassembly of the device 10.

While the elbow connector 20 as described above is a preferred means of connection, it should be understood that any number of other arrangements may be utilized to interconnect the front end portions 26, 28 of the boom 16 and the mast 18, respectively, in a manner so as to create a divergent bias force therebetween when in an assembled position while allowing collapsing of the device 10. Other such connectors may include a spring-loaded ratchet and pawl mechanism as illustrated in FIG. 3A or any other type of connector mechanism to create the function as described above. Referring to FIG. 3A, the tubular end portions 22, 24 are interconnected to a spring-loaded ratchet wheel 39 having teeth 41. A pawl 43 allows the tubular end portions 22, 24 to be moved toward each other, and the spring-loaded wheel 39 creates the bias force since the pawl 43 prevents return of the wheel 39 in response to the spring loading.

The device 10 is preferably readily collapsible so that all of the connection members are sized and arranged to permit removable attachment thereto. This permits the device 10 to be readily collapsed and disassembled for storage and transportation. As will be appreciated from the description of the invention, the device 10 may be easily and readily assembled on site of use without tools and without requiring significant time or effort.

In preferred form, the sail 12 may be constructed from any desired material appropriate to its use as a sail. In preferred form, a strong yet lightweight material such as a rip-stop nylon is preferred for the material 12. In addition, the material selected for the boom 16 and the mast 18 is preferably flexible so as to provide a flexible frame 14 for installation and use and for flexibility when the device 10 is engaged with the wind. Consequently, any relatively strong yet flexible material can be utilized. In one preferred embodiment, the boom 16 and the mast 18 are constructed from 0.75 inch diameter polyvinylchloride tubing. In an alternative form, graphite tubes or other similar lightweight, strong yet flexible material may be utilized. A tubular structure is preferred for easy attachment and disassembly as well as for an appropriate weight to strength ratio.

Referring now to FIGS. 1 and 5, the sail 12 is sized and shaped to have an upper edge 40 for engagement with the mast 18 and in particular the member portion 30 of the mast 18, a lower edge 42 for engagement with the boom 16, and a leech edge 44. The sail 12 may come to a point wherein the upper edge 40 joins the lower edge 42 as illustrated in FIG. 6, or the forward portion of the sail 12 may be cut so as to form a luff edge 46. The luff edge 46 provides the user of the sail 12 with an opening to see as well as enables easier attachment of the sail 12 to the frame 14 in that the connector 20 is free of any sail material. The upper edge 40 preferably includes a pair of hook and loop attachment strips 48, 50, preferably VELCRO®, running along the edge thereof. Likewise, the lower edge 42 includes a similar pair of attachment strips 52, 54 running along the edge thereof. The hook and loop attachment strips 48, 50 and 52, 54 provide an attachment mechanism for the sail 12 to the mast 18 and boom 16. In the preferred embodiment, the mast 18 is positioned along the upper edge 40 at the junction of the VELCRO® strips 48, 50, and then the VELCRO® strip 50 is folded over the mast 18 and joined to the VELCRO® strip 48 to form a flap 56 which securely holds the mast 18 therein. Likewise, the boom 16 is positioned along the juncture between the VELCRO® strips 52, 54, and the outer VELCRO® strip 54 is folded over the boom 16 to form a flap 58 to hold the boom securely therewithin. The flaps 56, 58 may be adjusted by adjusting the attachment between the attachment strips 48, 50 and 52, 54, respectively, in order to fine tune the tension in the sail 12 when the device 10 is fully assembled. It should be understood that other attachment mechanisms are well known in the art and may be utilized with the present invention, although the attachment mechanism illustrated provides not only for attachment of the mast 18 and the boom 16 to the sail 12 but for adjustment of the tension of the sail 12 in its assembled position. A pair of elongated sleeves 60, 62 are provided toward the leech edge 44 of the sail 12 and are sized and shaped to receive a pair of removable battens which provide for stiffening of the sail 12 in its assembled position and permit and permit for more effective catching of the wind.

Referring now in particular to FIGS. 1, 2 and 4, the end connectors 64 and 66 are provided for connecting a control handle 68 to the frame 14. The control handle 68 is preferably a convex flexible member made of material similar to the mast 18 and the boom 16. In preferred form, the handle 68 includes a concave tubular member 70 made of ½ inch polyvinylchloride tubing and includes a padded portion 72 which, in preferred form, is constructed from a foam material. As in the illustrated embodiment, the pad 72 extends a substantial portion of the length of the tube 70. The connector 64 is utilized to interconnect the upper end 74 of the handle 68 with the rear end portion 76 of the mast 18. Likewise, the connector 66 is utilized to interconnect the lower end portion 78 of the handle 68 to the rear end portion 80 of the boom 18. Each of the connectors 64, 66 are preferably constructed and arranged in a substantially identical manner and thus only one will be discussed in detail. Referring to FIG. 4, the upper connector 64 is constructed from a pair of tubular members 82, 84 each of which has a pair of annular notches 86 disposed along the outer surface thereof. Likewise, the connection ends 83, 85 of each of the tubes 82, 84, respectively, includes a pair oppositely disposed apertures 88 positioned at each end and are sized and shaped to receive the end portions of a pin connector 90. The rear end portion 76 of the mast 18 is inserted within the end 83 of the tube connector 82 and is preferably sized and shaped so as to slip-fit snugly therewithin. To insure the stability of the rear end portion 76 within the connector 82, a pin 90 is inserted into the pair of apertures 88 and engage similar apertures in the rear end portion 76. This connection is similar to that of the connector 20 previously described. Likewise, the tubular connector 84 is attached to the upper end portion 74 of the handle 68 in similar manner such that the upper end portion 74 is firmly force-fit within the end 85 of the connector 84. A pin 90 is also utilized to engage the apertures 88 in the connector 84 and to also engage similar holes located in the upper end portion 74. In this manner, the rear end portion 76 and the upper end portion 74 are firmly attached to the tubular connectors 82, 84.

The tubular members 82, 84 are in turn interconnected with each other by spring members so as to firmly position the tubular members 82, 84 substantially parallel and adjacent to each other. In one preferred embodiment, the spring members include a figure "8" spring 92 which is sized and shaped so that the openings 94, 96 therein may receive the tubular connectors 82, 84 to firmly seat the spring member 92 within the annular notches 86. In preferred form, a pair of such figure "8" spring members 92 are utilized to interengage the tubular members 82, 84. Thus, when the connector 84 is rotated in a planer direction relative to the tube connector 82 in response to movement of the handle 68 as described below, the spring members 92 twist in response thereto. This twisting action creates a bias force to urge the tubular member 84 back into substantially parallel aligned relationship with the tubular member 82. The greater the displacement of the tubular member 84 out of parallel relationship to the tubular member 82, the greater the bias applied by the spring member 92 due to greater stress created therewithin as the result of its shape. In other words, the more tube member 84 is rotated, the greated the force that is exerted against such rotation so as to gradually increase the difficulty of rotation of the member 84 the further it is rotated out of parallel relationship to the tubular member 82.

As indicated above, the lower end portion 78 of the handle 68 and the rear end portion 80 of the boom 16 are likewise interconnected with a pair of tubular connector members that make up the connector 66. As a result of this construction, as the handle 68 is moved away from the sail 12 as indicated by the arrow 98 of FIG. 2, the greater the bias force that is applied against such movement and to return the handle 68 in position against the sail 12. The significant advantage of this construction is described below. As can be seen from FIG. 2, however, the handle 68 may be placed on either side of the sail 12 depending on whether one desires to use the device 10 as a right-handed device or as a left-handed device. The device 10 as illustrated in FIGS. 1,2 and 6 is arranged so that the handle 68 is aligned for right-handed use, while the device 10 illustrated in FIG. 7 is arranged for left-handed use.

Referring now to FIGS. 6 and 7, an alternate embodiment for attachment of the handle 68 is illustrated therein. In this particular embodiment, the connectors 64, 66 are arranged in the same manner as in the embodiments illustrated in the FIGS. 1 and 2. However, in the embodiments illustrated in FIGS. 6 and 7, the handle 68 is attached to the outer-most tubular members 82 of each connector assembly 64, 66, while the mast end portion 76 and the boom end portion 80 are attached to the inner-most located tubular members of the connector 64, 66. This is the opposite of the assembly as illustrated in FIG. 1. In such an arrangement, the handle provides a somewhat different leveraging relationship to the device 10 as compared to the device illustrated in FIG. 1.

Referring to FIGS. 1, 6 and 7, a stay member 100 is preferably utilized to interconnect the connectors 64, 66 in order to assist in maintaining the desired angle "A" as well as to remove some of the tension stress from the VELCRO ® attachments on the flaps 56, 58 of the sail 12. The stay 100, while optional, is highly desirable and may be constructed from wire, string or any other flexible material. Moreover, while the sail device 10 of the present invention may be constructed in any desired size or shape, the preferred size for the average person would include a boom of approximately 5 feet and a height between the connectors 64, 66 of approximately 5.5 feet along the leech edge of the sail 12.

To assemble the sail device of the present invention, the mast member 32 and the boom 16 are attached to the connector 20, and then the mast 18 is fully assembled. The mast 18 and the boom 16 are then laid onto the sail 12 and attached thereto by the VELCRO ® attachments of the flaps 56, 58 of the sail 12. The handle 68 is then secured to the connectors 64, 66, which have already been initially attached to the appropriate rear end portions 76, 80 of the mast 18 and the boom 16. Once the handle 68 is attached to the connectors 64, 66, the stay 100 is secured, and the device 10 is then ready for use. To disassemble the device 10, the stay 100 is removed, and the handle 68 is then removed from the connectors 64, 66. The boom 16 and the mast 18 may be entirely disassembled from the sail device 12 or, in a preferred embodiment, the mast 18 is simply disengaged from the connector 20 removing the mast member 32, and the mast 18 and the boom 16 are then rolled together in the sail 12.

To utilize the device 10 of the present invention, the device 10 is assembled as described above. The user then holds on to the handle 68 at the padded portion 72 and lifts the sail device 10 on the leeward side of the user. The wind then catches the windward side of the sail 12 and propels the user along the ground surface. The angle of incidence between the wind and the sail 12 may be adjusted by simply tilting the sail device 10 utilizing the arm of the user and the handle 68. Moreover, the greater the force of the wind against of the windward side of the sail 12, the further the handle 68 will tend to pull away from the sail 12 in response to such wind-strength. The further the handle 68 moves from the sail 12, the greater the bias return force as created by the connectors 64, 66. Thus, a sudden gust of wind against the sail 12 will not tend to catch the user off guard and propel the user off his or her feet. Rather, such a sudden gust of wind will tend to pull the sail 12 away from the handle 68 so as to enable the user thereof to gradually be propelled rather than instantaneously in response to such a gust. Thus, the arrangement of the present invention provides for much safer usage of such a sail device in response to variable wind speeds and gusts as compared to state-of-the-art devices which have either fixed handles or handles secured by rope which provide no bias force relative to the sail.

It is also to be understood that a window may be placed within the sail 12 to allow the user thereof to look through the sail 12. However, since the sail device 10 is not of particularly great size as compared to some of the prior art devices, such a window is indeed optional and not required for safe usage of the device 10. The maintenance of the previously indicated angle "A" as well as the adjustment of the flaps 56, 58 insure that a proper tension on the sail 12 is provided so as to maximize the capability of the device 10.

As can be seen from the above, a hand-held said device of improved construction is provided. The sail device of the present invention is light weight and compact and is thus easier to use as compared to some of the prior art designs. Moreover, the sail device of the present invention may be easily and quickly assembled or disassembled for transport to a site of use. Another significant advantage of the present invention is that the handle portion thereof may be operated by a single hand allowing the other hand and arm of the user to be utilized for balance purposes. Moreover, the handle of the present invention acts as a safely feature to provide for gradual increase in speed in response to sudden increases in wind gusts and velocity as a result of the unique spring connection of the handle to the device. Finally, the tension of the sail is readily adjustable and maintained as the result of the construction of the present invention.

The foregoing description and the illustrative embodiments of the present invention have been shown in the drawings and described in detail in varying modifications and alternate embodiments. It should be understood, however, that the foregoing description of the present invention is exemplary only, and that the scope of the present invention is to be limited only to the claims as interpreted in view of the prior art. Moreover, the present invention illustratively disclosed herein suitably may be practiced in the absence of any element which is not specifically disclosed herein.

I claim:

1. A hand-held sail device comprising:
    a said sized and shaped to define an airfoil configuration and including an upper edge, a lower edge and a leech edge;
    frame means for supporting said sail, said frame means including a mast adapted for attachment to said sail upper edge and having front and rear end portions, and a boom adapted for attachment to said sail lower edge and having front and rear end portions;
    a hand-gripping member disposed on the windward side of said sail and having top and bottom end portions pivotally secured proximate the rear end portions of, respectively, said mast and said boom for controlled pivotal movement outwardly away from and inwardly toward the surface of said sail;
    first connector means for joining the front end portions of said mast and said boom;
    second connector means for pivotally interconnecting said gripping member top end portion and said mast rear end portion;
    third connector means for pivotally interconnecting said gripping member bottom end portion and said boom rear end portion; and
    means for limiting the pivotal movement of said gripping member outwardly away from and inwardly toward the windward surface of said sail.

2. The device as claimed in claim 1, wherein said sail includes attachment means disposed along said upper and lower edges thereof for removably securing said sail to said mast and said boom.

3. The device as claimed in claim 2, wherein said attachment means includes means for adjusting the tension in said sail.

4. The device as claimed in claim 1, wherein said hand-gripping member is shaped generally in an outwardly convex form relative to the plane of the windward surface of said sail.

5. The device as claimed in claim 4, wherein said hand-gripping member includes a cushion pad disposed along a substantial portion of the length thereof.

6. The device as claimed in claim 1, wherein said pivotal movement limiting means is adapted to create resistance against movement of said gripping member as said gripping member pivotally moves away from said sail in a windward direction.

7. The device as claimed in claim 1, wherein said first connector means is adapted to biasly urge said mast and said boom away from each other to create tension in said sail.

8. The device as claimed in claim 7, wherein the angle between said mast and said boom maintained by said first connector means is approximately 75–80 degrees when said device is in its fully assembled position.

9. The device as claimed in claim 7, wherein said mast and said boom are removably attached to said first connector means.

10. The device as claimed in claim 7, wherein said first connector means comprises an elbow member having tubular ends adapted to receive the front end portions of said mast and said boom, respectively, said tubular ends being normally aligned at an angle of greater than about 80 degrees relative to each other prior to assembly of said sail device, said elbow member being constructed of a material having sufficient resiliency to permit movement of said tubular ends toward each other to create an angle of 80 degrees or less to provide said bias between said mast and said boom.

11. The device as claimed in claim 7, wherein said first connector means comprises a substantially inflexible connector member having a pair of tubular ends adapted to receive, respectively, the front end portions of said mast and said boom and including means to move said mast and said boom toward each other to create said bias between said mast and said boom.

12. The device as claimed in claim 7, wherein said device further includes a stay member interconnecting said second and said third connector means to assist in maintaining said tension.

13. The device as claimed in claim 6, wherein said pivotal movement limiting means comprises spring members adapted to increase resistance against movement of said gripping member as said gripping member pivotally moves further from said sail in a windward direction.

14. The device as claimed in claim 13, wherein said spring members are disposed at said second and third connector means.

15. The device as claimed in claim 1, wherein said second and third connector means each comprises a pair of connector elements aligned adjacent to each other and interconnected by resilient means for applying bias to maintain said connector elements in their adjacent relationship, said resilient means being adapted to increase said bias as said connector elements rotate relative to each other in response to pivotal movement of said gripping member.

16. The device as claimed in claim 1, wherein said device is collapsible for storage and transport.

17. In a hand-held sail device having a mast, a boom a sail defining an airfoil configuration and supported by said mast and boom, and a hand-gripping member for carrying and controlling said device when in use, the improvement wherein said mast includes front and rear end portions and said boom includes front and rear end portions, wherein said sail includes an upper edge securable to said mast, a lower edge securable to said boom, and a leech edge defined between the rear end portions of said mast and boom, wherein said hand-gripping member is disposed on the windward side of said sail and includes top and bottom end portions pivotally secured proximate the rear end portions of, respectively, said mast and said boom for controlled pivotal movement outwardly away from and inwardly toward the surface of said sail, and wherein said device includes means for limiting and controlling pivotal movement of said gripping member outwardly away from and inwardly toward the windward said of said sail.

18. The sail device as claimed in claim 17, wherein said improvement further comprises first connector means for joining the front end portions of said mast and said boom, second connector means for pivotally interconnecting said gripping member top end portion and said mast rear end portion, and third connector means for pivotally interconnecting said gripping member bottom end portion and said boom rear end portion.

19. The sail device as claimed in claim 18, wherein said first connector means comprises an elbow member disposed proximate the luff end of said sail and having tubular ends adapted to receive the front end portions of, respectively, said mast and said boom, the tubular ends of said elbow member being greater than approximately 80 degrees relative to each other prior to assembly of said device and being constructed from a material having sufficient flexibility to permit said tubular members to be moved toward each other at an angle of approximately 75–80 degrees therebetween to create a bias force urging said mast and boom away from each other to provide tension in said sail.

20. The sail device as claimed in claim 19, wherein said improvement further includes a stay interconnecting said second and third connection means to assist in maintaining the tension in said sail.

21. The sail device as claimed in claim 18, wherein said pivotal movement limiting means comprises spring members adapted to increase the resistance against movememt of said gripping member away from said sail as said gripping member moves further from the windward surface of said sail.

22. The sail device as claimed in claim 21, wherein said second and third connecting means include said spring members.

23. The sail device as claimed in claim 22, wherein said second and third connector means each comprises a pair of tubular connector elements aligned adjacent and substantially parallel to each other and interconnected by spring members adapted for applying bias to maintain said connector elements in said parallel and adjacent relationship, said spring members being further adapted to increase the bias force as said connector elements rotate relative to each other out of said parallel relationship in response to pivotal movement of said gripping member.

24. The sail device as claimed in claim 23, wherein said second and third connector means comprises tubular elements sized and shaped to receive the end portions of said mast, said boom and said hand-gripping member, and wherein each said spring member is in the form of a figure "8" with the tubular elements of each pair of said connector elements passing through adjacent openings defined by said figure eight connector.

25. A free-standing, hand-held, collapsible sail device for use in propelling an individual across a surface on means associated with the feet of said individual, said sail device comprising:

a sail sized and shaped to define an airfoil configuration and including an upper edge, a lower edge and a leech edge;

a frame for supporting said sail and including a mast adapted for removable securing said sail upper edge, and a boom adapted for removable securing said sail lower edge, each said mast and boom having front and rear end portions;

a hand-gripping member disposed on the windward side of said sail and capable of being positioned on either side of said sail, said hand-gripping member including top and bottom end portions pivotally secured to the rear end portions, respectively, of said mast and said boom;

first connector means for releasably joining the front end portions of said mast and said boom to each other in a manner to create a bias force urging said mast and said boom away from each other in a divergent manner to provide tension in said sail;

second connector means for releasably pivotally interconnecting said hand-gripping member top end portion and said mast rear end portion;

third connector means for releasably pivotally interconnecting said hand-gripping member bottom end portion and said boom rear end portion; and means for limiting the pivotal movement of said hand-gripping member away from said sail by increasing the bias force against said movement in direct relation to the distance the gripping member is moved from the windward side of said sail.

26. The device as claimed in claim 25, wherein said sail includes releasable closure devices disposed along the upper and lower edges thereof for adjustable and removable attachment of said sail to said frame, said closure devices also permitting tension adjustment of said sail between said mast and said boom.

27. The device as claimed in claim 25, wherein said device further includes a stay member interconnecting said second and third connection means to assist in maintaining the tension of said sail when in assembled position.

28. The device as claimed in claim 25, wherein said hand-gripping member is convex in shape relative to the windward surface of said sail.

29. The device as claimed in claim 28, wherein said pivotal movement limiting means for said gripping member comprises spring members located at said second and third connector means adapted for increasing the resistance against movement of said gripping member as said gripping member pivotally moves further from the windward side of said sail.

30. The device as claimed in claim 29, wherein each said second and third connector means comprises a pair of tubular connector elements aligned adjacent to each other and interconnected by said spring members for applying bias to maintain said connector elements in said adjacent relationship, said spring members being adapted to increase the bias force between said adjacent connector elements as said connector elements rotate relative to each other in response to pivotal movement of said gripping member away from the windward side of said sail.

31. The device as claimed in claim 30, wherein a pair of connector elements comprises a pair of tubular members, said tubular members being interconnected by said spring member constructed in the form of a figure eight connector, said tubular elements passing through the openings defined by said figure eight connector.

32. The device as claimed in claim 25, wherein said first connector means comprises a flexible elbow member having tubular end portions adapted to receive the front end portions of said mast and said boom, respectively, the end portions being greater than 80 degrees relative to each other prior to assembly of said device and being approximately 75–80 degrees relative to each other after assembly of said sail device, the flexible nature of said elbow member providing a bias force urging said mast and boom away from each other to create tension in said sail.

33. The device as claimed in claim 25, wherein the first connector member comprises a substantially inflexible connector member having tubular ends adapted to receive the front end portions of said mast and boom respectively, and including means for maintaining the angular relationship of said tubular ends between 75–80 degrees while providing a bias force urge in said mast and boom away from each other to create tension in said sail.

* * * * *